US010731999B2

(12) United States Patent
Lim

(10) Patent No.: US 10,731,999 B2
(45) Date of Patent: Aug. 4, 2020

(54) SYSTEMS AND METHODS FOR PROVIDING AN INTEGRATED PUBLIC AND/OR PRIVATE TRANSPORTATION SERVICE

(71) Applicant: MANJA TECHNOLOGIES SDN BHD, Johor Bahru (MY)

(72) Inventor: Chern Chuen Lim, Johor Bahru (MY)

(73) Assignee: MANJA TECHNOLOGIES SDN BHD, Johor Bahru (MY)

( * ) Notice: Subject to any disclaimer, the term of this patent is extended or adjusted under 35 U.S.C. 154(b) by 0 days.

(21) Appl. No.: 15/772,520

(22) PCT Filed: Oct. 30, 2015

(86) PCT No.: PCT/MY2015/000088
§ 371 (c)(1),
(2) Date: Apr. 30, 2018

(87) PCT Pub. No.: WO2017/074172
PCT Pub. Date: May 4, 2017

(65) Prior Publication Data
US 2018/0321049 A1    Nov. 8, 2018

(51) Int. Cl.
*G01C 21/34* (2006.01)
*G08G 1/123* (2006.01)
*G08G 1/14* (2006.01)
*G08G 1/00* (2006.01)
*G06Q 10/04* (2012.01)
(Continued)

(52) U.S. Cl.
CPC ..... *G01C 21/3423* (2013.01); *G01C 21/3484* (2013.01); *G06Q 10/047* (2013.01); *G08G 1/005* (2013.01); *G08G 1/123* (2013.01); *G08G 1/133* (2013.01); *G08G 1/144* (2013.01); *G08G 1/146* (2013.01); *G08G 1/147* (2013.01); *G08G 1/202* (2013.01)

(58) Field of Classification Search
CPC ............ G01C 21/3423; G01C 21/3484; G08G 1/202; G08G 1/147; G08G 1/146; G08G 1/144; G08G 1/123; G08G 1/005; G08G 1/133; G06Q 10/047
USPC ......................................................... 701/410
See application file for complete search history.

(56) References Cited

U.S. PATENT DOCUMENTS

2006/0129313 A1   6/2006   Becker et al.
2006/0167621 A1   6/2006   Dale
(Continued)

FOREIGN PATENT DOCUMENTS

WO         2013134863 A1     9/2013

OTHER PUBLICATIONS

International Search Report for International Patent Application No. PCT/MY2015/000088 dated Mar. 7, 2016.
(Continued)

*Primary Examiner* — Brian P Sweeney
(74) *Attorney, Agent, or Firm* — Moore & Van Allen PLLC; Henry B. Ward, III

(57) ABSTRACT

A transportation services platform that allows transit service provider and third party transportation providers to access the platform and provide rules that apply to a state-based view of a route provided to a user application executed by the user device. The application executed by the users device uses the rules to perform actions as a route is presented to a user via a user interface.

39 Claims, 14 Drawing Sheets

(51) Int. Cl.
    *G08G 1/005*     (2006.01)
    *G08G 1/133*     (2006.01)

(56) References Cited

U.S. PATENT DOCUMENTS

2015/0100231 A1    4/2015   Weir et al.
2016/0231129 A1*   8/2016   Erez ................. G01C 21/3423

OTHER PUBLICATIONS

Written Opinion for International Patent Application No. PCT/MY2015/000088 dated Mar. 7, 2016.
International Preliminary Report on Patentability for International Patent Application No. PCT/MY2015/000088 dated Jan. 29, 2018.

\* cited by examiner

SYSTEMS AND METHODS FOR PROVIDING AN INTEGRATED PUBLIC AND/OR PRIVATE TRANSPORTATION SERVICE

FIELD OF THE INVENTION

This invention relates to provision of an Internet service for planning trips using public and private transportation services. More particularly, this invention relates to a platform that allows public transportation providers and third party developers to access the platform to provide a service that integrates public and private transportation services for a user.

BACKGROUND OF THE INVENTION

In today's society, there are plenty of software applications, commonly called Apps, provided for smart phones or other mobile devices for use in the planning and managing of trips between various destinations. These applications include navigation applications, public transit updating application, ride sharing applications, and parking spot applications.

However, it is a problem that a user must often switch between applications for various portions of a trip. For example, a user may use a navigation application to get directions between an embarkation and destination locations and may have to switch to a parking spot locator application to find a parking spot in a car park once they have arrived at the destination in their vehicle. A second example is that a user may use a public transit application to find schedules and routes of busses or trains for a portion of a trip and switch to a taxi or ride sharing application to request a taxi or ride share to the ultimate destination when the user reaches a certain point on the route. As such, there is a need for a system that makes the switching between applications easy and relatively seamless for a user as the user progress on their trip.

Another problem that is faced is that public transportation providers often use scheduling software and other systems that only optimize based upon the information for a particular public transportation provider and often do not account for the routes and schedules of other public transportation provider in an area. For example, a bus operator in a particular system may use scheduling software that only accounts for the busses and routes that the bus operator provides. This may cause conflicts and gaps in scheduling between the various routes operated by different bus operators in a particular city or area. As such, there is a need for a system that integrates the information for various public transportation operators in a particular area to optimize the scheduling and routing of various types of public transportation.

SUMMARY OF THE INVENTION

The above and other problems are solved and an advance in the art is made by a transportation services platform performing in accordance with embodiments of this invention. In accordance with some embodiments, the transportation services platform allows transit operators and third party transport service providers to access data stored by the platform. In accordance with some embodiments, a state-based approach is used for trips. The transit operators and third party transport service providers may provide rules that direct an application being executed by a user device to perform an action based on an event detected from current state information of the trip maintained by the application. Furthermore, the transportation services platform may protect user privacy concerns by using usernames to associate user profile information of a user with data provided the user to platform and/or for allowing the user to interact with a third party transport service provider.

In accordance with some embodiments of the invention, a transportation services platform interact with an application being executed by a user device over a network in the following manner. The platform may receive a request from an application being executed on a user device to provide a route for a trip. The platform then retrieves route information for the trip. The retrieving of route information may include determining rules provided by third party transportation services that may apply to the route of the trip. The rules may include an event and an action where an event is an occurrence that may be detected by data obtained by the application being executed on the user device and an action is a function that the application may perform. The rules provided by third party transportation services that may apply to the route are added to the route information. The platform then provides the route information to the application being executed on the user device.

In accordance with some embodiments, the transportation services platform may receive a rule from a third party transportation service system and store the rule in a rules database. In accordance with many of these embodiments, a rule provided by a third party transportation service system includes an event and an action where the action includes invoking a third party transportation service application on the user device. In accordance with a number of these embodiments, a rule provided by a third party transportation service system includes an event and an action, where the action includes obtaining travel data via the transportation services application being executed by the user device and providing the travel data to the third party transportation service application. In accordance with a few embodiments, a rule provided by a third party transportation service system includes an event and an action, where the action includes providing travel information to the transportation services application being executed by the user device and displaying the travel information to the user via the transportation services application being executed by the user device.

In accordance with some embodiments, the transportation services platform maintains a user database that associates user profile information of a user with a username. In accordance with many of these embodiments, the transportation services platform stores and provides comments by a user using the username associated with the user. In accordance with a number of these embodiments, the transportation services platform performs a request for interactions with a third party transportation service system requested by a user using the username associated with the user.

In accordance with some embodiments, the transportation services platform receives a request for information from a transit operator system. In response to receiving the request, the platform retrieves data stored by the transportation services platform to satisfy the request for information and provides the requested information to the transit operator system.

In accordance with some embodiments, the transportation services platform receives data pertaining to a transportation service from a transit operator system and stores the data in a memory associated with the transportation services platform.

In accordance with some embodiments, the transportation services platform maintains information including one or more tags in a user profile of a user, receives a posting to the transportation services platform, determines tags associated with the posting, and provides the posting to each user having a user profile with a tag associated with the posting.

In accordance with some embodiments, the transportation services platform receives an update of user information, determines tags associated with the update, and add the tags to user profile information stored by the platform.

In accordance with some embodiments, the transportation services platform predicts possible trips for a user based upon stored user information, and updates tags in the user profile information of the user based on the predicted possible trips.

BRIEF DESCRIPTION OF THE DRAWINGS

The above and other features and aspects in accordance with various embodiments of the invention are shown in the following drawings.

DETAILED DISCLOSURE OF THE INVENTION

Figure 1:
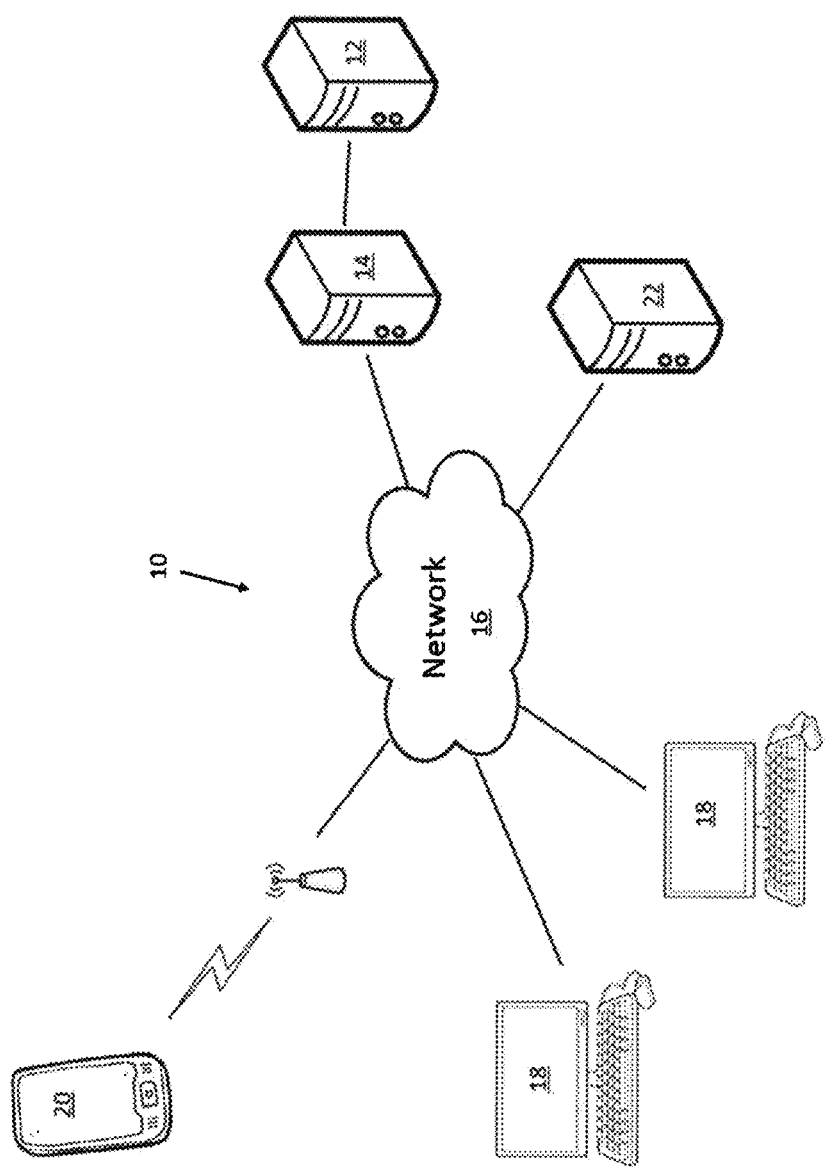
FIG. 1 illustrating a network communicatively connecting devices in accordance with an embodiment of this invention.

Turning now to the drawings, a transportation service system in accordance with various embodiments of this invention is disclosed. In accordance with some embodiments of this invention, a platform is created in which various transportation providers including, but not limited to, transportation authorities, mass transit operators, and private transportation providers are able to connect and provide web-based services to users. The platform allows transportation provider to develop various cloud-based services that a user may access via the Internet and more particularly via an App being performed by a mobile device. The platform allows the provision of integrated transportation services such that the services and related information are not isolated. This allows for the integration of information from the various transportation providers. The platform simplifies the development of transportation service applications through the development of abstract handlers in the platform with which other applications are able to communicate and be invoked when required.

In accordance with some embodiments, the platform includes a central back-end system that is able to interface with other applications. Further, the central system provides core functionalities of the travel platform including, but not limited to, a trip state machine, a data-turntable that application can use to develop further applications, and fundamental services provided by a mobile device application.

In accordance with some embodiments of the invention, the state based view of a trip divides a trip into a series of segments or states. In accordance with many of these embodiments, predictive modeling algorithms may be provided to detect transitions between states. The predictive modeling algorithms may also determine when to provide alerts and/or messages to the uses when traveling conditions change and effect travel times during a trip in accordance with a number of embodiments. Furthermore, the state based view of a trip allows other applications to interact with a user based upon a current state of a trip. Another application may either obtain information about the trip or invoke an instance of the application based on the state of the trip to allow for a seamless transition between applications providing needed services during a particular leg of a trip. For example, a user may be using a navigation application to get driving directions to a destination and when the car gets to the destination, a parking locator application may detect that the user has arrived at the destination and invoke an instance of the application to help the user find a parking spot near the destination.

In accordance with some embodiments, the platform also provides logic and functionality that allows applications to utilize transit related data. For example, the platform may provide processes that determine an estimated time of arrival at a destination and/or an estimated time of transition to a next leg or state of the trip. These processes may then be used by application developers to provide various features in applications.

In accordance with some embodiments, an application provided by a user device allows a user to interact with the transportation platform. The application includes a unified user interface in accordance with many of the embodiments. The unified user interface is designed to include a universal interface that fits with the workflow of the user and to allow other applications to integrate information and/or links into the interface to allow for additional extensions of the travel experience through the use of other applications provided by third parties. In accordance with many embodiments, the user interface includes three main components: an area map display, a state of trip information display, and dynamic information display. The map area provides a map indicating the locale of the user and may further indicate the route being taken for the trip, and/or points of interest in the local or along the route depending on the particular embodiment. The state information of the trip display may provide information relevant to the current state (or leg) of the trip. For example, the state information may provide information about traffic information, busses scheduled to stop at a particular stop, and/or busses servicing a particular stop. The dynamic information display may alert users to changes in bus schedules, traffic warnings, and/or points of interests along a particular leg of the trip.

In accordance with some embodiments, the platform allows the creation of "channels" or "app links" that allow an external application to integrate into to the platform. Each "channel" is a rule that includes an event or state; and an action associated with the event. In accordance with a number of embodiments, at least the following types of actions are supported by the platform: alternative travel options, information display, and message. Alternative travel option actions provide alternative travel options for the trip based on the current state of the trip. For example, a $3^{rd}$ party application may offer a link or icon to open the application when a certain state or location is reached during a trip. Information display actions provide information about the $3^{rd}$ party application. This may include a schedule of provider vehicles such as busses or taxicabs that are either in proximity of the current location or are scheduled to stop at or near the current location.

In accordance with some embodiments of the invention, the platform supports maintaining user profiles; and stores user comments and allows other users access to the comments. In accordance with many embodiments, user information is protected by associating a username with a user that is used to identify the user. This allows users to be uniquely identifiable while at the same time their personal information is not linked to their actual identity. Furthermore, in accordance with a number of embodiments, the user name may be used to sign into $3^{rd}$ party applications to keep the user anonymous.

In accordance with some embodiments of this invention, the platform provides the ability for different transport entities to interact with the platform to use transportation data stored by the platform, provide transportation data to the platform, and/or provide applications or functionalities to a user accessing the platform via an application. This allows the different transportation entities in providing service in a certain area to interact with other providers which in turn leads to a seamless communication with a user accessing the platform via an application performed by a user device.

A description of the above and other features and aspects of a transportation platform in accordance with some embodiments of this invention are provided below.

Network Overview

A network that includes processing devices that provide a transportation services platform in accordance with embodiments of this invention is shown FIG. 1. Network 10 includes communications network 16. Communications network 16 is a network such as the Internet that allows devices connected to network 16 to communicate with other connected devices. A platform server system is connected to network 16 and provides a transportation services platform. The platform server system includes servers 12 and 14 that are communicatively connected to one another by an internal network. Servers 12 and 14 perform the processes for providing a transportation services platform and store data associated with the transportation services platform. The platform server system may also include third party server 22. Those skilled in the art will recognize that while three servers are shown, any number of servers may be included in platform provider system. Furthermore, one or more database servers (not shown) may be communicatively connected to servers 12, 14 and 22 to store data for providing the transportation services platform.

Users interact with the transportation services platform using personal devices 18 and 20 that connect to the platform server system over network 16. In the shown embodiment, personal device 18 is shown as a desktop computer that is connected via a conventional "wired" connection to network 16. However, personal device 18 may be a desktop computer, a laptop computer, a smart television, an entertainment gaming console, automobile infotainment system or any other device that connects to network 16 via a "wired" connection. Mobile device 20 connects to network 16 using a wireless connection. A wireless connection is a connection that uses Radio Frequency (RF) signals, Infrared signals, or any other form of wireless signaling to connect to network 16. In FIG. 1, mobile device 20 is a mobile telephone. However, mobile device 20 may be a mobile phone, Personal Digital Assistant (PDA), a tablet, a smartphone, automobile infotainment system or any other type of device that connects to network 16 via wireless connection without departing from this invention.

Example of Processing System

Figure 2:
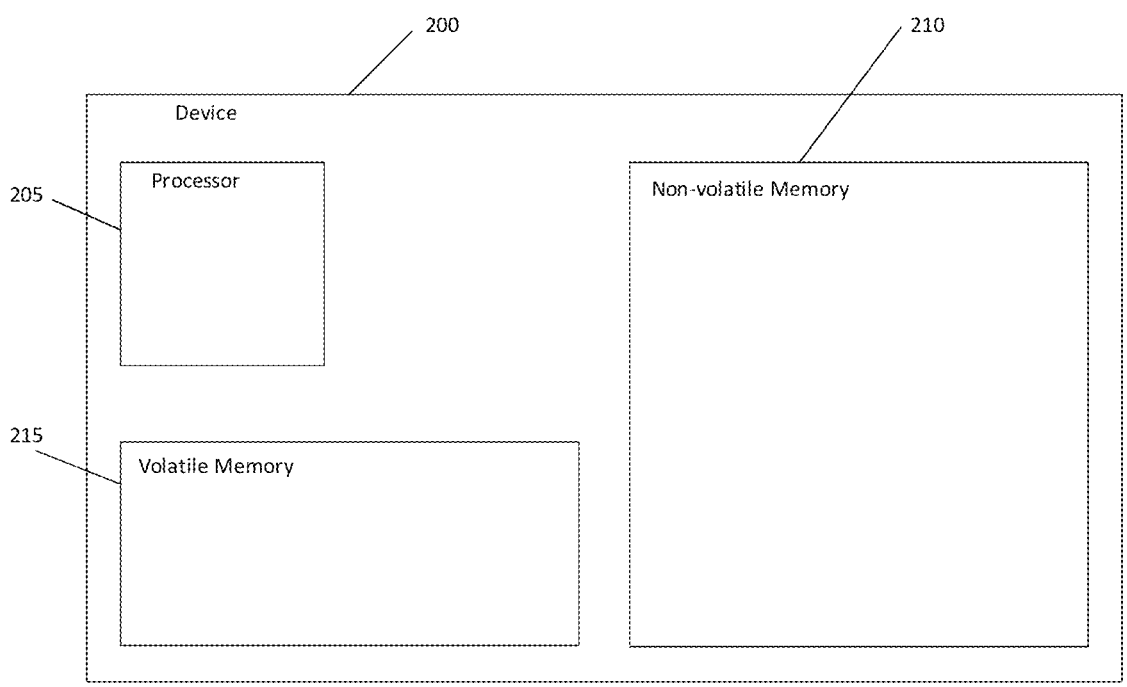
FIG. 2 illustrating a processing device that performs one or more processes providing a system and/or method in accordance with an embodiment of this invention.

An example of a processing system that executes instructions to perform processes that provide applications, such as the processes that provide and interact with a transportation services platform in the devices shown in FIG. 1 in accordance with embodiments of this invention is shown in FIG. 2. One skilled in the art will recognize that a particular processing system may include other components that are omitted for brevity without departing from this invention. The processing device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the processing system 200 to perform processes including processes in accordance with embodiments of the invention and/or data for the processes being utilized. In other embodiments, the processing system software and/or firmware can be stored in any of a variety of non-transient computer readable media appropriate to a specific application. A network interface is a device that allows processing system 200 to transmit and receive data over network based upon the instructions performed by processor 205. Although a processing system 200 is illustrated in FIG. 2, any of a variety of processing system in the various devices can configured to provide the methods and systems in accordance with embodiments of the invention can be utilized.

Transportation Services Platform

Figure 3:
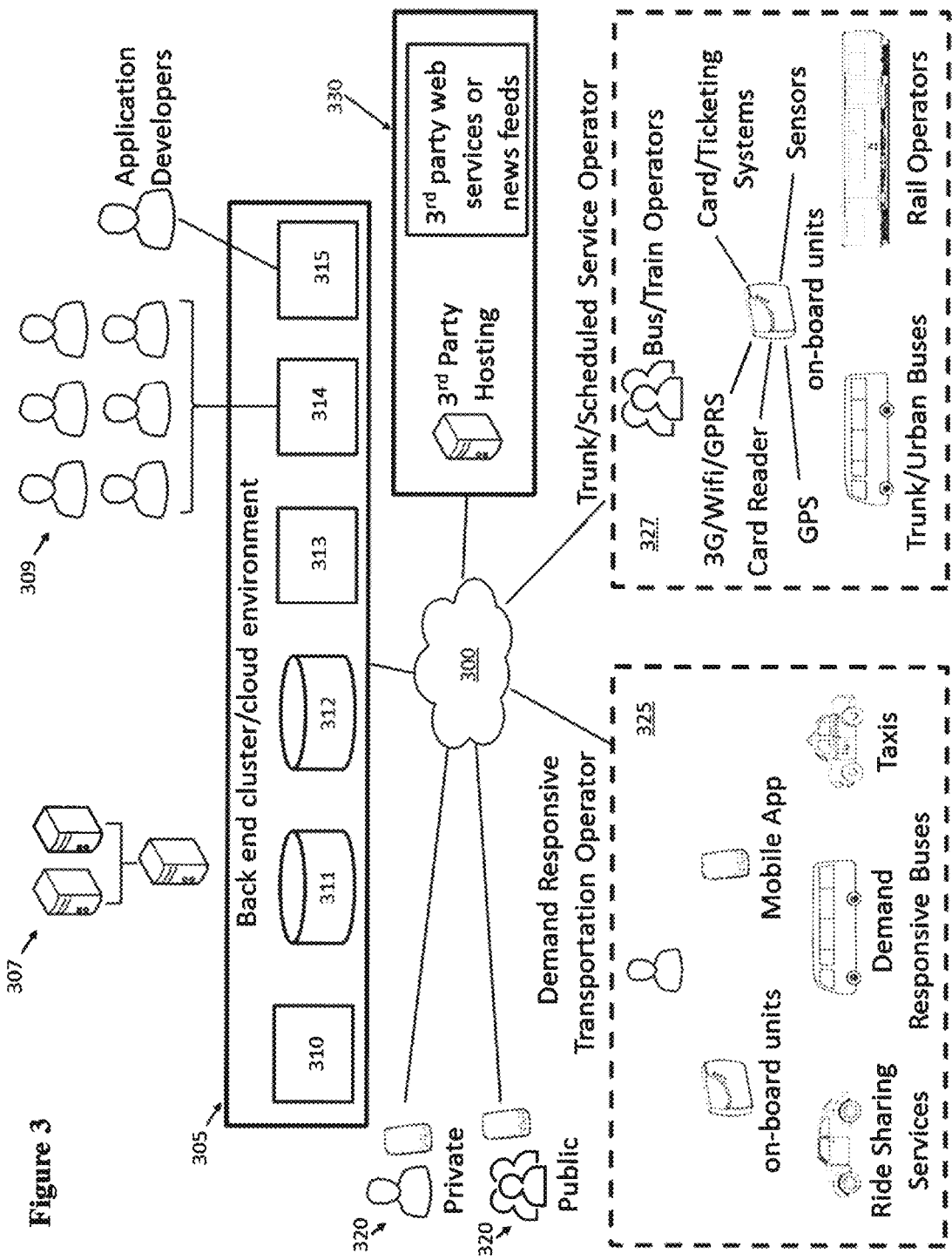
FIG. 3 illustrating an operating environment of transportation information system in accordance with an embodiment of this invention.

A transportation services platform in accordance with embodiments of this invention is a system that interacts with applications performed on a user device to provide transportation services to a user. The operating environment of a transportation services platform in accordance with an embodiment of this invention is shown in FIG. 3. In the embodiment shown in FIG. 3, server system 307 provides transportation services platform 305. Transportation services platform 305 includes software and/or hardware that provides portal 310, user demand database 311, public transportation routes and timing database 312, core functionality services 313, transportation operator portal 314, and third party application configuration portal 315. The user portal 310 includes the interfaces for interacting with applications on a user device. The user demand database 311 stores user data such as, but not limited to, trips taken, routes used, transportation modes used, time of trips taken, and other information relevant to the transportation uses of a user. The public transportation routes and timing database 312 store information about the routes and stop schedules of transportation vehicles such as, but not limited to, busses and trains. In accordance with some embodiments, the public transportation routes and timing database may include separate databases for each city or particular geographic region supported by platform 305. Core functional services 313 are the processes provided platform 305 that store, retrieve and manipulate data stored in the various databases to provide functions provided to the application on a user device, public transportation operator systems, and/or third party systems. Transit operator portal 314 provides interfaces to transit operator systems 309 including retail/commercial establishments, transit hub operators, city councils, planning authorities, transit agency/operator, and transport authorities) for platform 305 to receive data from and provide data to transit operator systems. Third party application portal 315 provides interfaces for third party applications to interact with platform 305.

Platform 305 connects to the Internet 300. Over Internet 300, platform 305 may communicate with user devices of private and public transport users 320; on-board devices including, but not limited to, car infotainment systems, Global Positioning (GPS) systems, navigation systems, and other mobile device in the transportation vehicles 325; transit dispatch and control systems 327 to interact with the users and obtain current transit information; and third party reporting services systems 330 that provide information on local traffic, weather conditions, and other aspects that may affect travel times in a locale.

Figure 4:
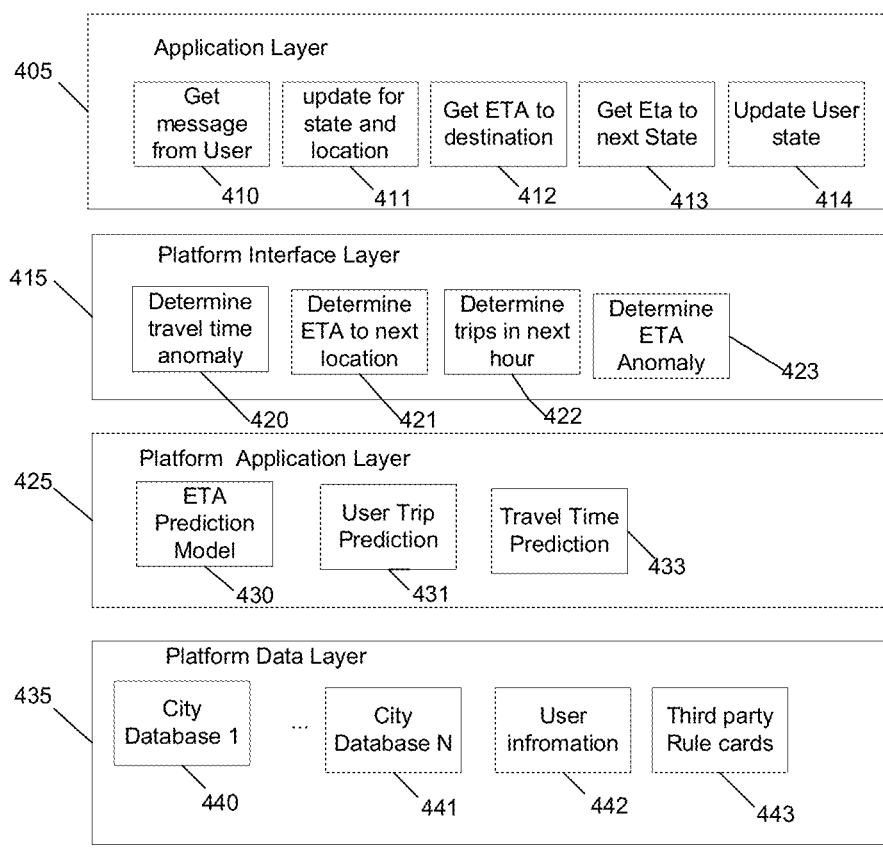
FIG. 4 illustrating layers of software in a provider platform in accordance with an embodiment of this invention.

The platform may include various layers of software to provide information to users and/or transit operators. A diagram showing the various layers of software provided by the platform in accordance with an embodiment of the invention is shown in FIG. 4. In accordance with the shown embodiment, the platform includes four layers including application layer 405, platform interface layer 415, platform application layer 425, and platform data layer 435. Application layer 405 includes software that provides functions that may interact with an application being executed by a user device. Examples of the functions that may be provided by application layer 405 include, but are not limited to, get message from user function 410, update for state and location function 411, get ETA to destination function 412, get ETA to next state function 413, and update user state function 414. Get message from user function 410 receives an input from a user via the application executed by the user device. Update for state and location function 411 receives updated location and trip information from applications being executed on user and/or transportation vehicle devices. Get ETA to destination function 412 provides an estimated time of arrival at a desired destination to applications being executed on user and/or transportation vehicle devices. Get ETA to next state function 413 provides an estimated time of arrival at a next leg of a trip to applications being executed on user and/or transportation vehicle devices. Update user state function 414 receives a current state of a trip from an application being executed by a user device. Although the above example primarily involve interactions with an application providing a user interface on a user device, one skilled in the art will recognize that application layer 405 may also include applications for interacting with transit operator systems and third party systems in accordance with various embodiments of the invention.

Platform interface layer 415 includes functions that interact with functions in application layer 405 and platform application layer 425 to transfer information between functions that may be used by an application and functions that obtain and process data stored by the platform in accordance with some embodiments of the invention. Examples of the functions provided by platform interface layer 415 in accordance with the shown embodiment include, but are not limited to, determine travel time anomaly function 420, determine ETA to next location function 421, determine trips in the next hour function 422, and determine ETA anomaly function 423. Determine travel time anomaly function 420 determines whether there are any environmental conditions that may affect the travel time to a particular destination. Determine ETA to next location function 421 determine an estimated time of arrival at next location either a destination or a next leg of a trip. Determine trips in the next hour function 422 provides a list of possible trips a user may take based on pass trips taken by a user. Determine ETA anomaly function 423 is a function that determines whether a previously provided ETA is still accurate based upon current environmental conditions along the route of the trip. Although the above example primarily involve interactions with an application providing a user interface on a user device, one skilled in the art will recognize that platform interface layer 415 may also include applications that obtain data from data stored on the platform for transit operator systems, third party systems, and users in accordance with various embodiments of the invention including, but not limited to, a payment application that allows users to pay for a transportation service via the platform and a social messaging application that allows users to receive and/or send messages pertaining to a particular trip or location.

Platform application layer 425 includes the functions that retrieve and manipulate data stored by the platform to obtain desired information in accordance with some embodiments of the invention. Examples of functions provided by platform application layer 425 in accordance with the shown embodiment include, but are not limited to ETA prediction model 430, User trip prediction model 431 and travel time prediction model 433. ETA prediction model 430 is an artificial intelligence algorithm that learns from the data stored in the platform and uses the learning to predict an estimated time of arrival at a location. User trip prediction model 431 is an artificial intelligence algorithm that learns habits of user regarding trips from user data stored by the platform and returns a list of possible destination for the user based upon environmental conditions. Travel time prediction model 433 is an artificial intelligence algorithm that estimates the travel time between one or more locations based upon the mode of transportation used, time of day, environmental conditions, and/or other factors. Although the above example primarily involve interactions with an application providing a user interface on a user device, one skilled in the art will recognize that platform application layer 425 may also include applications that obtain and manipulate data stored on the platform to obtain desired information for transit operator systems and third party systems in accordance with various embodiments of the invention.

Platform data layer 435 includes the processes and functions for maintaining the data needed to provide the various transportation services in accordance with some embodiments of this invention. Examples of the databases maintained include, but are not limited to, a database for each city or local supported by the city databases 440-441, user information databases 442, and third party rules database 443. Each city database 440-441 includes data regarding routes, stop schedules and the like for public and/or private transportation companies. User information database 442 is a database that stores user information including, but not limited to, profile information, previous trips, transportation mode preferences and the like. Third party rules database stores rules generated for third parties for interacting with application executed by a user device in accordance with some embodiments of the invention.

User Device Application

In accordance with some embodiments of the invention, an application for providing transport services to a user is executed by a user device and communicates with a transportation services platform. The application provides a user interface that allows the user to interact with the application to receive a desired transport service. In accordance with some embodiments of the invention, the user interface has a universal design to fit with the individual workflow of a user and allows for "lead-ins" to other applications in order to allow for additional extensions of the travel experience through interacting with other applications. Furthermore, the user interface is provided in a manner that fits with the "state-based" view of a trip used by the platform in accordance with embodiments of the invention. A user interface of an application in accordance with an embodiment of the invention is shown in FIG. 5.

Figure 5:
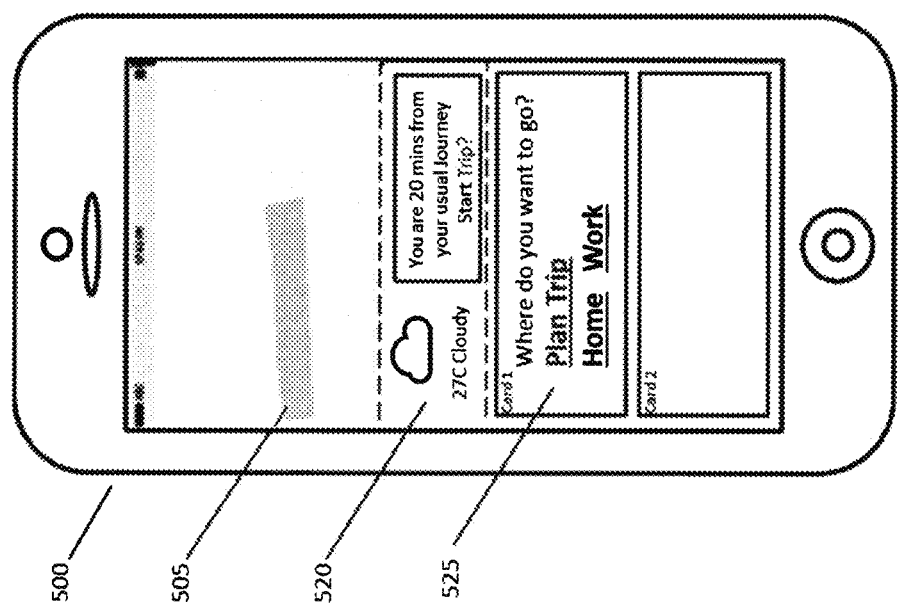
FIG. 5 illustrating a display on a user device performing an application interacting with the platform in accordance with an embodiment of this invention.

In accordance with FIG. 5, user device 500 is executing the user application that communicates with the platform to provide transport services. The display of device 500 is showing the user interface of the application. The user interface includes three areas: map area 505, travel state information area 520, and dynamic information area 525. Map area 505 is a geographic map or other form of indicia indicating the locale of the user. Hence, it displays the map of user's current location and planned trip. As those skilled in the art will appreciate, the map area may be interacted with to "zoom-in" and "zoom-out" to change the resolution of the map or locale being shown to the user. Travel state information area 520 provides information relevant to a current state of a trip and changes as the current state of the trip changes. Dynamic information area 525 provides information of third party application to be provided in response to the rules provided by the third party application as well as information provided by the platform that may change as the trip progresses. Hence, dynamic notification information to inform users regarding their journey and allow a holder of "cards" or containers which allow for display of information from third party developers, as well as other information generated by the platform.

The above interface may be one of multiple user interfaces provided the application in accordance with embodiments of the inventions. In accordance with some embodiments, another interface may be provided to allow payment for a transportation service using the platform. In accordance with many embodiments, a user interface may be provided for a social messaging system. In accordance with a number of embodiments, a base user interface is provided that allows a user to select a function supported by the travel services platform and subsequently provide a user interface for the selected function.

Figure 6:
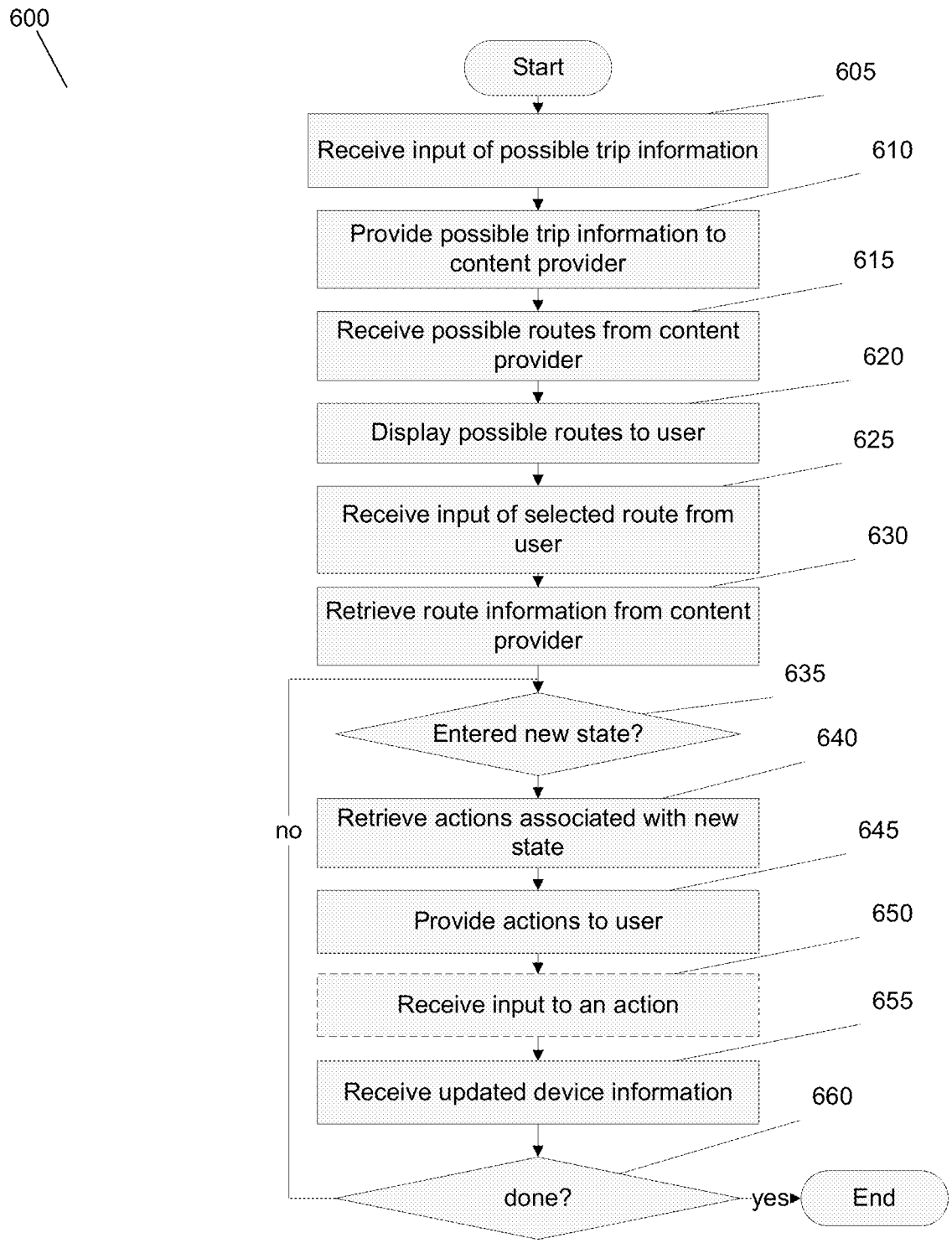
FIG. 6 illustrating a flow diagram of a process performed by a user device to provide trip information in accordance with embodiments of this invention.

In accordance with some embodiments of this invention, the transport service platform use a state-based model of a trip in order to allow third party providers to add information and/or services to be provided to a user based on the state of the trip. The third party provider is allowed to add information and/or service by generating rules that include an event and an action to take in response to the event. A pair of an event and a rule is sometimes described as a card or rule and these terms may be used interchangeably. The rules provided by third party providers are stored by the platform and the relevant rules are provided to an application being executed on a user device based on the current state of a trip. A process performed by the application being executed by the user device to provide information for a trip in accordance with an embodiment of an invention is shown in FIG. 6.

Process 600 begins by the application receiving an input of information for a possible trip from the user (605). The information for the possible trip may include mode(s) of transportation to take, transit operator(s) to use, destination, time to leave, and other information that may be needed to determine one or more possible routes for the trip. The information for the possible trip is provided to the transport service platform (610). The application receives possible routes for the possible trip from the platform (615). A display showing the possible routes is provided to the user via the user interface (620). This display of possible routes may be done by showing the different routes in alternate colors on the map or via alternate descriptions on the interface in accordance with various embodiments of the invention.

The application receives a selection of a particular route for the trip from the user (625) and retrieves route information for the selected route from the platform (630). In accordance with some embodiments, the route information includes the rules from the platform and/or third party providers that may apply to one or more portions or states of the trip.

The process then monitors information such as GPS position and time to determine when the user device has entered a new state of the trip (635). For example, a new state may be, but is not limited to, when a new location is reached and/or when the user must turn onto a new street, when the user reaches a particular bus stop, and other such events. In accordance with some embodiments, the updates to the monitored information may be provided to the transportation services platform for use in updating user information and/or other trip and/or state information. The application then searches the events in the rules or cards to determine which cards are related to the new state and determine the actions that are to occur (640). The determination may include which third party provider has made the rule and determining whether the user is subscribed to the service of the third party. The relevant actions are then provided to the user (645). In accordance with some embodiments, the actions may include, but are not limited to, providing an icon or other form of link to the application of the third party installed on the user device, providing scheduling information (such as bus and train schedules) at a particular stop, or providing some other type of information that may be relevant to the trip the user is taking and/or the current state of the trip. In some instances, the user device may receive inputs requested by a particular action in response to the action provided to the user (650) in accordance some embodiments. The device updates device according to the action and any inputs that are received (655). If the trip is not completed (660), the process of detecting new states and actions are repeated until the trip has reached a final state and process 600 ends.

Process 600 is one possible embodiment of a process performed by application being executed by a user device to provide information and/or services for a trip. However, other processes that add, combine, and/or omit certain steps of the above described process may be provided without departing from embodiments of this invention.

Platform Processes

Figure 7:
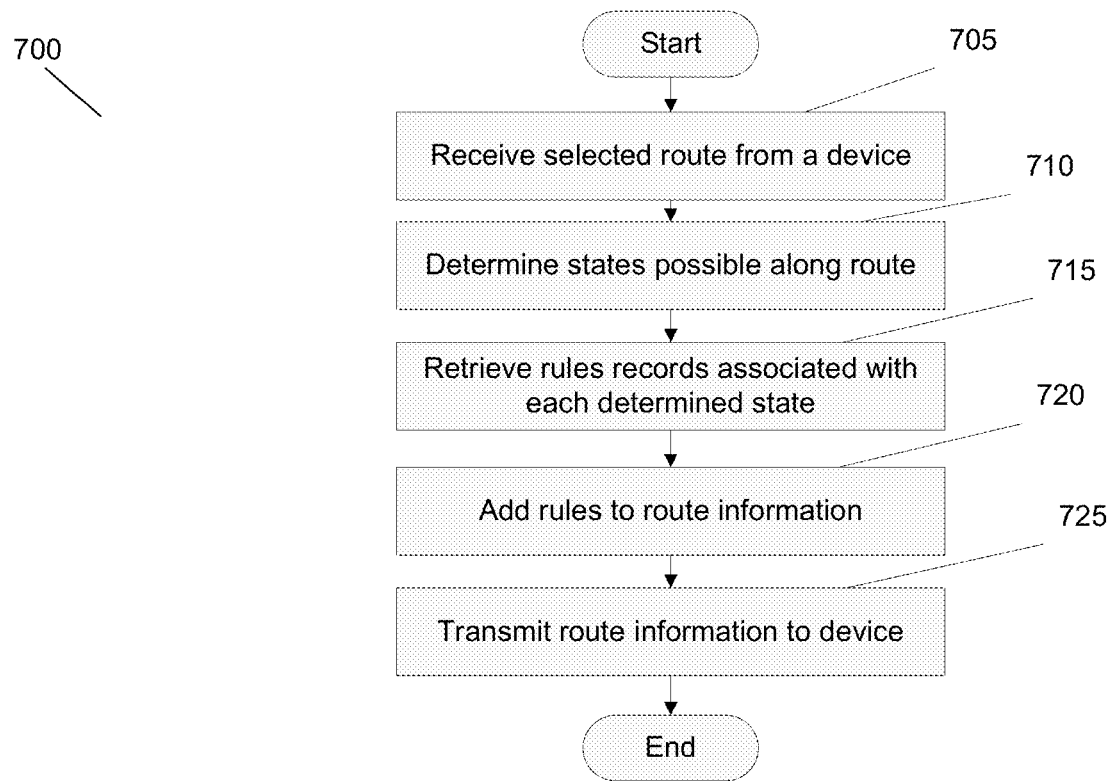
FIG. 7 illustrating a flow diagram of a process performed by the platform to provide route information to a user device in accordance with an embodiment of this invention.

The platform provides information to the application to provide transportation services to a user for a trip. A process for providing the information from the platform to an application being executed by a user device in accordance with an embodiment of the invention is shown in FIG. 7. In process 700, the platform receives a selected route from the device (705). In response to receiving the route, the platform determines the states possible along the route (710) and retrieves the records of rules associated with each determined state of the route (715) and adds the rules to the route information (720) and transmits the route information to the requesting application on a user device (725).

Process 700 is one possible embodiment of a process performed by a platform to provide information and/or services to an application being executed on for a trip. However, other processes that add, combine, and/or omit certain steps of the above described process may be provided without departing from embodiments of this invention.

Figure 8:
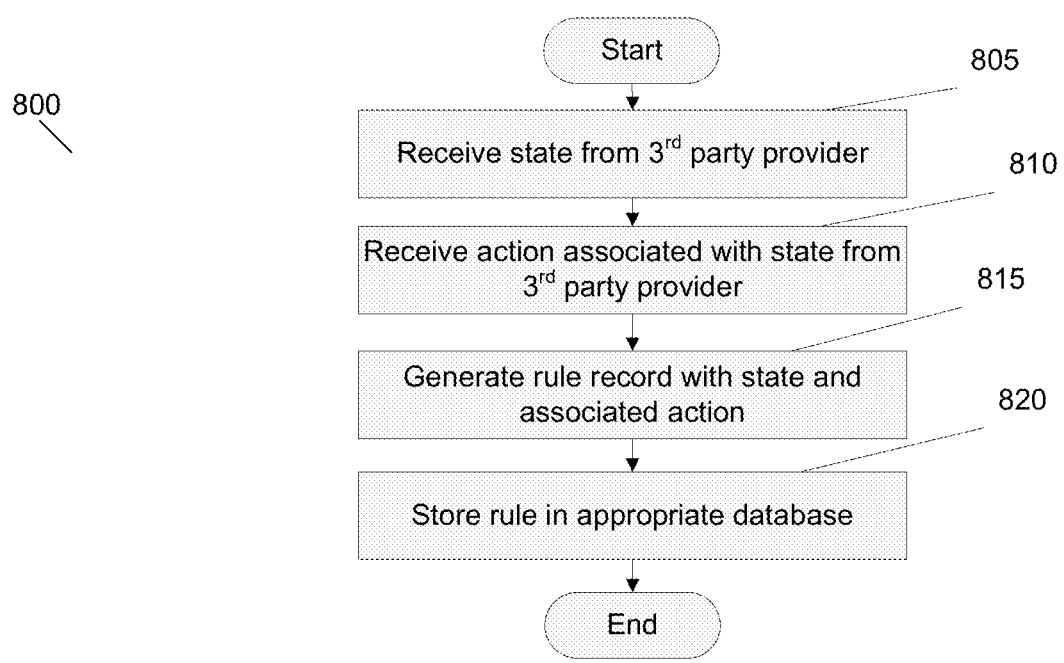
FIG. 8 illustrating a flow diagram of a process performed by the platform to receive and store a rule from a $3^{rd}$ party provider in accordance with an embodiment of this invention.

In accordance with some embodiments of a transport service platform, the transport service platform may receive rules or cards from third party provider systems that cause an application being executed by a user device to perform an action in response to an event. In this manner, third party providers may interact with the platform to provide transport services and/or provide or receive information from the user and/or application being executed on the user device. A process for receiving rules or cards from a third party provider system in accordance with some embodiments of the invention is shown in FIG. 8.

In process 800, the service transport platform receives an event from the third party provider system (805). An event may be a particular state of a trip, a particular location, a particular time of day, or any other particular piece of information of a type of information that may be monitored by an application being executed on a user device. The service transport platform also receives an action associated with the event from the third party provider system (810). The action may be any type of action that the application being executed on the user device may perform. Examples in accordance with some embodiments of the invention include, but are not limited, providing data from the application to the third party provider, providing data from the third party provider to the application, providing an icon for invoking a third party application on the user device, and providing a link to a web site of the third party provider.

The transport service platform generates a rule record or card that includes the event and the associated action (815) and stores the rule record in a rule record database on the platform (820). In accordance with a number of the embodiments, the rule record database may include one or more databases that store rules for individual cities or other locales that are supported by the platform.

Process 800 is one possible embodiment of a process performed by a platform to receive rules or cards from a third party provider. However, other processes that add, combine, and/or omit certain steps of the above described process may be provided without departing from embodiments of this invention.

Figure 9:
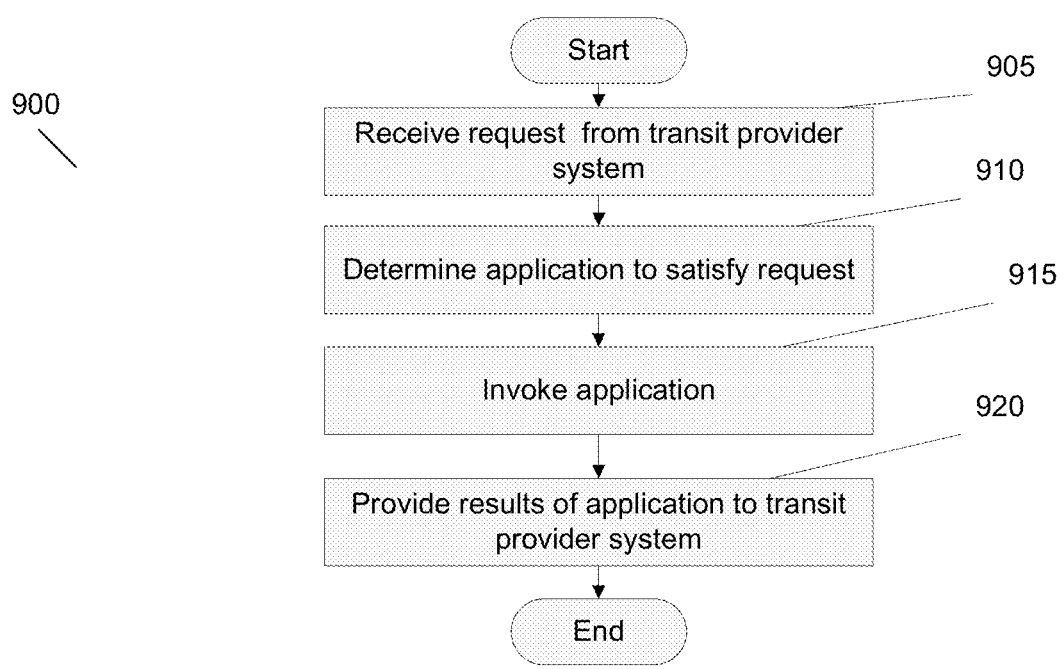
FIG. 9 illustrating a flow diagram of a process performed by the platform to satisfy a request from a transportation operator system in accordance with an embodiment of this invention.

In accordance with some embodiments, the transport service provider may allow transit operator system to connect to the platform to provide and receive data. In accordance with many of these embodiments, the transport service platform provides applications that retrieve and/or manipulate the data stored by the platform to obtain the information desired by the transport service provider system. A process performed by the transport service platform to obtain the desired information for a transit operator system in accordance with an invention is shown in FIG. 9.

In process 900, the transport service platform receives a request from information from a transit operator system (905). The platform determines the proper application to satisfy the request (910). The determined application is then invoked (915). The application then retrieves the proper data and performs any required algorithms on the data to determine the information to satisfy the request. The results of the application are then provided to the transit operator system (920).

Process 900 is one possible embodiment of a process performed by a platform to provide information to transit operator system. However, other processes that add, combine, and/or omit certain steps of the above described process may be provided without departing from embodiments of this invention.

Figure 10:
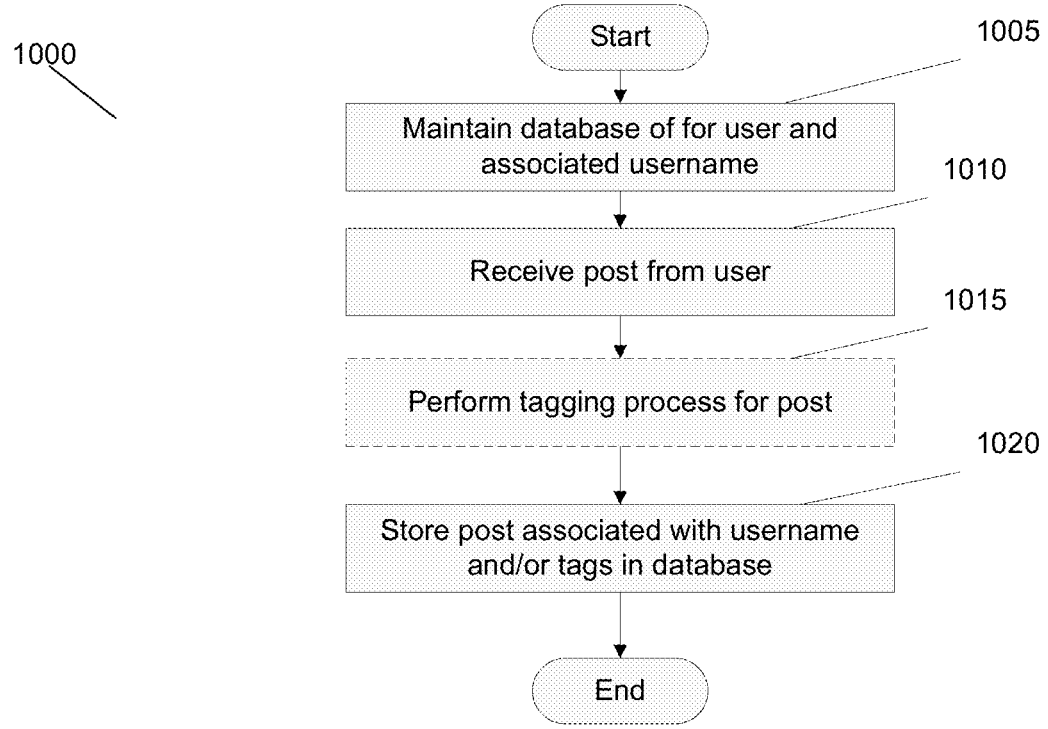
FIG. 10 illustrating a flow diagram of a process performed by the platform to receive a user comment in accordance with an embodiment of the invention.

In accordance with some embodiments of the invention, the service provider platform ensures the privacy of users by providing users names that are associated with the profile information of the user. The username is then used to identify the user in the platform to allow the user to remain anonymous in accordance with embodiments of this invention. A process for storing a comment from a user and making the comment public on the platform in accordance with an embodiment of the invention is shown in FIG. 10.

Process 1000 includes maintaining a database of users that associates a user with a user name (1005). At some point, the platform receives a post of the user on a trip, location, and/or transportation service (1010). In accordance with some embodiments, a tagging process may be performed on the post to provide the post to other users (1015). A tagging process in accordance with an embodiment of the invention is described below with reference to FIG. 13. The platform then stores the comment in a database with the user name of the user providing the comment for later review by other users and/or transit operators (1020).

Process 1000 is one possible embodiment of a process performed by a platform to maintain comments by user. However, other processes that add, combine, and/or omit certain steps of the above described process may be provided without departing from embodiments of this invention.

Figure 11:
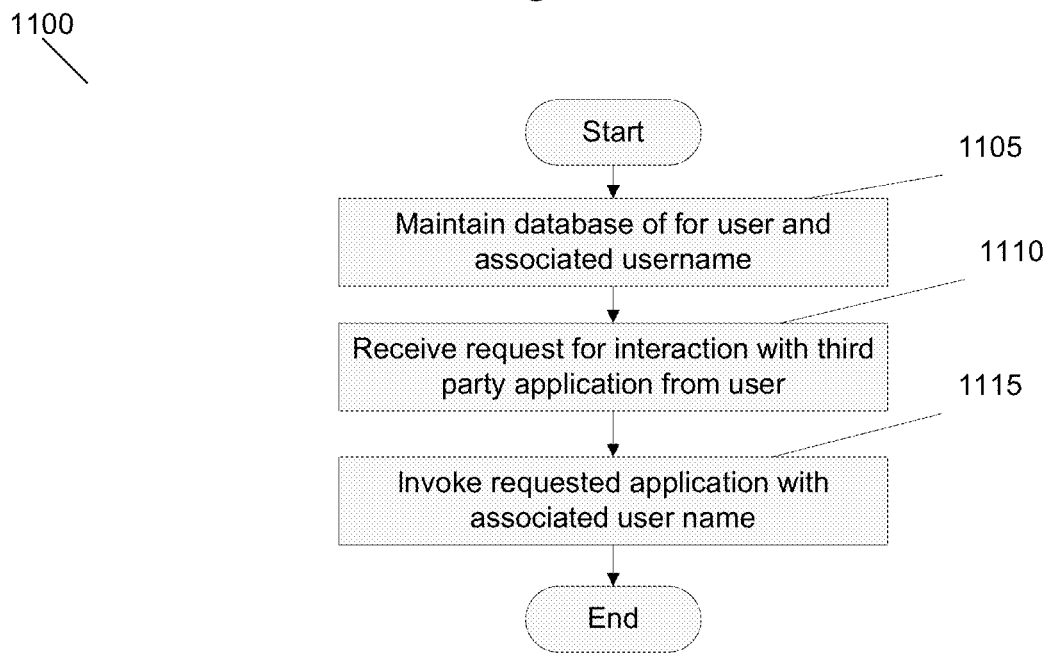
FIG. 11 illustrating a flow diagram of a process performed by the platform to invoke a 3rd party application for a user in accordance with an embodiment of the invention.

In accordance with many of these embodiments, the username may be used to invoke third party application and/or communicate with a third party in some other manner. A process for communicating with a third party provider in accordance with one embodiment of the invention is shown in FIG. 11. In process 1100, the platform maintains a database of users where each record includes a user and an associated user name (1105). The platform may then receive a request for a third party service from a user using the application being executed on the user device of the user (1110). The platform then invokes the proper application for communicating with the third party system using the username of the user stored in the user database (1115).

Process 1100 is one possible embodiment of a process performed by a platform to provide a third party service to a user. However, other processes that add, combine, and/or omit certain steps of the above described process may be provided without departing from embodiments of this invention.

Figure 12:
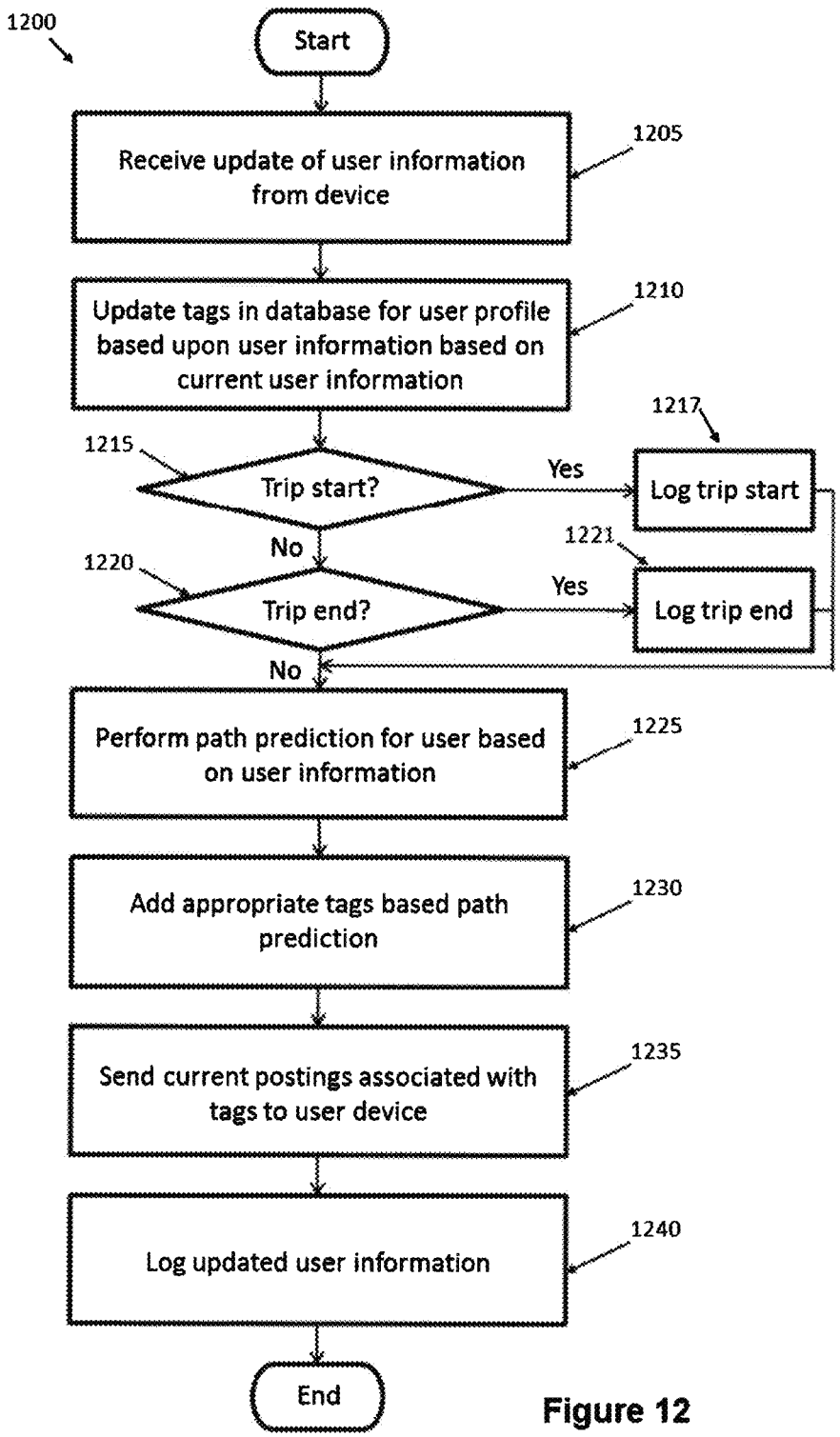
FIG. 12 illustrating a flow diagram of a process performed by a transport service platform to provide tags for a user profile based on user information received from an applications being executed on a user device in accordance with an embodiment of the invention.
Figure 13:
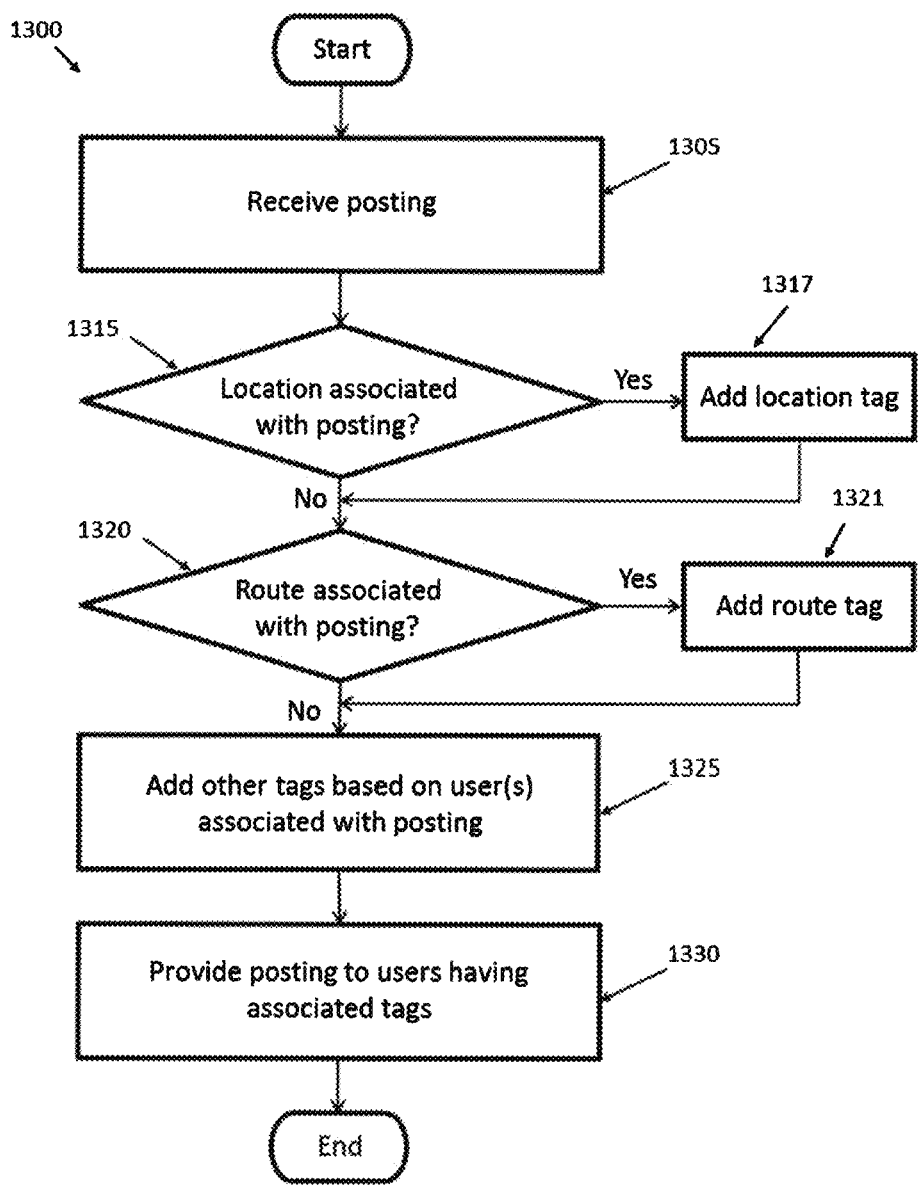
FIG. 13 illustrating a flow diagram of a process performed by a transport service platform to tag a post received from a user in accordance with an embodiment of the invention.

In accordance with some embodiments of the invention, the transportation services platform may provide a social messaging application that allows users within a certain proximity or travelling along a common route to message one another and/or receive postings to the transportation services platform that are relevant to the location and/or route without any user input indicating the user's mode of transportation, route, and/or current location. Furthermore, transportation providers may use send messages relating to routes and/or locations that may be provided to users that may be travelling or may be planning to travelling along the route as well as users in a certain locale. To do so, a transportation services platform may use a tagging process for users and postings to denote users in a particular area or traveling along a particular route to form groups of users for a messaging application and/or pass along relevant postings to users in accordance with many embodiments. Processes for performing a tagging process of users and posting in accordance with some embodiments of the invention are shown in FIGS. 12 and 13. The tags may then be used by the social networking platform to form groups of users for a messaging application and/or to provide postings to applications on a user device in accordance with a number of embodiments of the invention. Postings received by the user device may then be displayed in the dynamic information area of the user interface and/or provided via another posting interface in accordance with various embodiments of the invention.

A process performed by the transportation services platform for updating tags in a user profile in accordance with an embodiment of the invention is shown in FIG. 12. Process 1200 includes receiving an update of user information from an application being executed by a user device (1205). In accordance with a number of embodiments, the update of user information may be an update of monitored information transmitted by the device when a user enters a new state of a trip as discussed above with respect to process 600 shown in FIG. 6.

Returning to process 1200 shown in FIG. 12, process 1200 updates the appropriate tags in a user profile of the user based upon the received updated information (1210). The updating of appropriate tags may include removing tags from locations and/or states of the trip completed, adding tags related to a current location and/or current state of the trip.

The process 1200 determines whether the updated information indicates the start of a trip (1215). If so, the start of the trip is logged in a database for use in future prediction processes and for other later uses (1217). The process also determines whether the updated information indicates the end of a trip (1220). If so, the process 1200 logs the end of the trip in a database for use in future predictions and other uses (1221).

Process 1200 also performs a path prediction analysis to determine probable next states of the trip and/or probable destinations of the user (1225). Based on the predicted paths, the appropriate tags are added to the user profile (1230). The appropriate tags may include potential locations, potential modes of transportation, potential paths that may be taken, and/or other topics that may be of interest along potential paths for a trip in accordance with various embodiments of the invention.

The process 1200 also provides any current messages that are associated with a tag added to the user profile with the user device (1235) and logs the updated user information and/or any predicted paths in a database for future use (1240).

Process 1200 is one possible embodiment of a process performed by a transport service platform to update user tags. However, other processes that add, combine, and/or omit certain steps of the above described process may be provided without departing from embodiments of this invention.

To provide user post to the transportation service system to users that might find the information in the post relevant, the transport service platform tags posts upon receipt and provides the posts to user device of user's that have the same tag in their user profile. A process performed by the transport service platform to tag posts in accordance with embodiments of this invention is shown in FIG. 13. In accordance with some embodiments of the invention, the process is performed in response to receiving a post, such as when a new posting is received in process 1000 described above with reference to FIG. 10.

Process 1300 receives a new post (1305). The process determines whether a location is associated with the post (1315). The determination of whether a location is associated with the post may be determined in any number of ways in various embodiments including, but not limited to, using user information of the user that provided the post to determine a current location, using meta data in the message that may indicate the location, the use of user embedded tags (such as hashtags), GPS information from the sending device, parsing the text of the posting to obtain a name of a location and/or any combination of the previously mentioned methods. If the post is related to a particular location, a tag is added to the post indicating the particular location (1317).

The process 1300 may also determine whether the post relates to a route (1320). The determination of whether a route is associated with the post may be determined in any number of ways in various embodiments including, but not limited to, using user information of the user that provided the post to determine whether the user is currently using a particular route, the use of user embedded tags (such as hashtags), GPS information from the sending device, parsing the text of the posting to obtain a name of a location and/or any combination of the previously mentioned methods. Depending on the various embodiments of the invention. If the post is related to a particular route, a tag is added to the post indicating the particular route (1321).

The process 1300 may also add tags that are related to user that provided the posting (1325). These tags may include tags pertaining to groups or subjects of interest to user, user assigned tags, and any other tags that may relate the tag to a location or route. The tags for the post may then be stored with the post or in a manner that associates the tags with the post for future use in accordance with some embodiments of the invention. The process 1300 then uses the tags to provide the post to users also having at least one of the tags of the added to the post (1330).

Process 1300 is one possible embodiment of a process performed by a transport service platform to provide tags for posts. However, other processes that add, combine, and/or omit certain steps of the above described process may be provided without departing from embodiments of this invention.

In accordance with some embodiments of the invention, the transportation services platform includes an Estimated Time of Arrival (ETA) module that provides a process for provided an estimated time for arrival at one or more points along a route being used by a user.

In some embodiments, an ETA process for determining the ETA for one or more points on a route may be based upon historical data. An ETA process based on historical data provided in some embodiments is based upon the idea that the time to arrive at a first point will have an effect on the time needed to travel to a second point. Furthermore, it is known if many trips are included in the historical data, an arrival time at one more point may be related to more than one arrival time at a second point (separate trips may arrive have the same arrival time at a first point. However, the same two trips may have different arrival times at the second point due to traffic or other environmental conditions). Furthermore, the process is only looking for an approximation of arrival times. Based upon these facts, the process in accordance with embodiments of the invention groups the arrival time at each point in bins or approximation groups. The groups of arrival times for a first point are then associated or related to each approximation groups of a second point that is subsequently adjacent (the next stop or point in the trip). Each approximation group of the first point is related or associated each approximation group of the second point that includes an arrival time that is dependent on an arrival time in the approximation group of the first point (as mention above an arrival time that was observed in multiple trips may be related to multiple different arrival times at the second point. As such, an arrival time for the first point may be associated with to different arrival times for the second point that are in different approximation groups of the second point.).

When a new arrival time is received for the first point, a determination is made as to the approximation group that would include the new arrival time and the approximation groups of the second group that are related to the determined approximation group can be used to provide an estimated time of arrival at the second point. To make the estimation easier, a current approximation time of arrival may be provided for each group. The current approximation of a group may be determined in any number of manners, including, but not limited to the mean time of the group, the median time of the group, the center point of the group or any other manner in accordance with various embodiments of the invention. In accordance with some embodiments, the mean arrival time for the elements in an approximation group is used as the approximation time to allow for improvement of the approximation time as more data is received as will be described below.

The estimated time of arrival at the second point can be determined using the approximation groups of the second point that are associated with the approximation of the new arrival time including, but not limited to, selecting a longest estimated time from the associated approximation groups, selecting the shortest estimate time from the associated approximation groups, determining average for the approximation times of the associated groups, and determining a weighted average of the approximation times of the groups.

The approximation time of each approximation group for each point improves as data from more trips is used to determine the approximation time. As such, data mining of trip information may be used to obtain more data to base the approximation. In accordance with some embodiments of the invention, a k-cluster algorithm is used to perform the data mining. To improve the results of the k-cluster algorithm, the number, k, of clusters used to mine data for each point is set to the number of approximation groups plus an additional group to capture extraneous samples and the seeds used are the approximation times of each approximation group determined from a smaller sample of the data. Using the k-clustering algorithm, the approximation time changes as more elements (trip data) are added to the groups.

Figure 14:
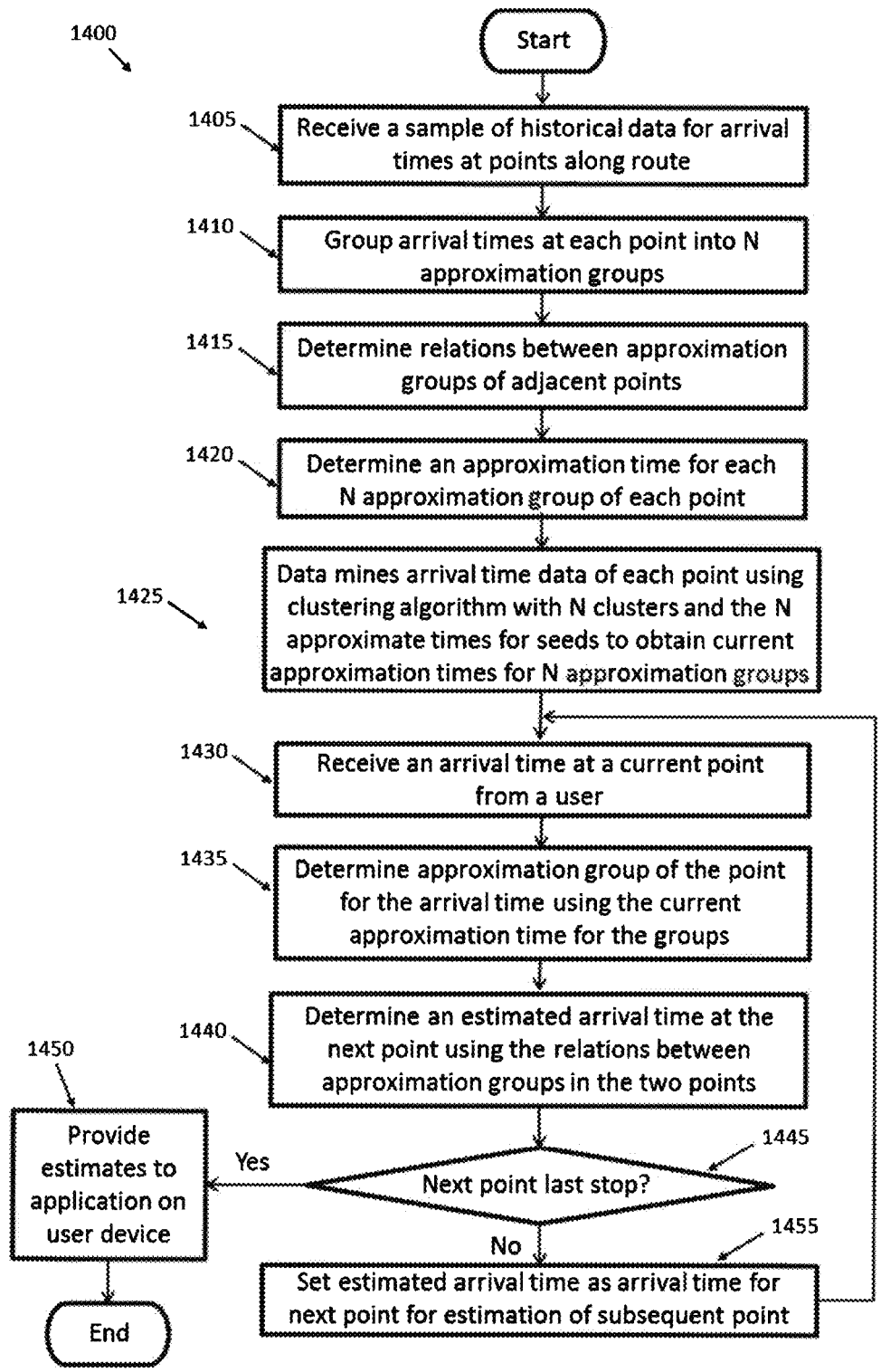
FIG. 14 illustrating a flow diagram of a process performed by a transport service platform to provide estimates of arrival times at one or more points along a route based on historical data in accordance with an embodiment of the invention.

A process performed by the transportation services platform that provides a process for determining an estimated time of arrival at one or points along a trip using historical data in accordance with an embodiment of the invention is shown in FIG. 14. In process 1400, a sample set of historical data of arrival times at points along a route for a predetermined number of trips are retrieved (1405). The arrival times for each point are then grouped into N approximation groups for the point where N is determined by the range in variance between the observed arrival times for the point (1410).

The relations between approximation groups of adjacent points along the trip are determined (1415). In accordance with some embodiments, the determination of a relation between approximation groups is determined by which groups in each point include arrival times that are obtained from the same trip. In some these embodiments, this may be determined by including the arrival times for each point in a vector where the nth position in each vector indicate the arrival time at the point in the nth trip. In other various other embodiments, columnizing the data or other data structuring methods may be used to indicate the relatedness of arrival times for adjacent points.

An approximation time is then determined for each approximation group of each point (1420). In accordance with some embodiments, the mean time of each approximation is used as the approximation time. However, other methods as described above may be used without departing from this invention.

The process 1400 then data mines the entire set of data of arrival times for the points on a route using a k-clustering algorithm with N+1 clusters for each point where N is the number of approximation groups for a point and the additional cluster is for noise and each of the N clusters has an approximation time of one of the N groups of the point as a seed to determine a current approximation time for each group for each point (1425). In accordance with some embodiments, the data mining may be performed continuously. In accordance with some other embodiments, the data mining is performed periodically to determine the current approximation times.

The process 1400 then receives the arrival time at a current point along a route from a user (1430). The approximation to which the received arrival time belongs is determined based upon the approximation time of the groups. In accordance with some embodiments, the determination is made by determining the absolute value of the difference between the received arrival time and the approximation time for each group of the point. The group that has the approximation time with the smallest difference is selected as the group of the received arrival time.

The process 1400 may then determine the approximation groups of the second subsequent point related to the determined approximation of the first point for the new arrival time (1435). As estimated arrival time at the second point is then determined using the approximation times of the approximation groups related to the approximation point of the received arrival time (1440). As discussed above, this estimated arrival time can be determined in any number of manners including, but not limited to, selecting a longest estimated time from the associated approximation groups, selecting the shortest estimate time from the associated approximation groups, determining average for the approximation times of the associated groups, and determining a weighted average of the approximation times of the groups in accordance with various embodiments of the invention.

A determination is then made as to whether second point is the last stop of the route (1445). If so, all estimate times for all points are returned to user device (1450) and process 1400 end. Otherwise, the estimated time is substituted for the new arrival time and the second point becomes the first point and a third subsequent point becomes the second point as the estimation process (1430-1455) to determine an estimated arrival time at the subsequent is repeated until the last stop is reached.

Process 1400 is one possible embodiment of a process performed by a transport service platform to estimate arrival time at points along a route. However, other processes that add, combine, and/or omit certain steps of the above described process may be provided without departing from embodiments of this invention.

Operator/Driver Application

The transport service platform may also interact with a driver/operator application executed by a device on a vehicle of a transportation service provider. Example of driver/operator devices that may execute a driver operator application in accordance with some embodiments of this invention, include, but are not limited, a mobile telephone, a smart phone, a tablet, a vehicle infotainment system, and any other processing system that may be onboard a transportation service provider vehicle. In accordance with some embodiments, the driver operator device includes and/or is connected to devices that provide a GPS system and a card validation system. In accordance with many embodiments, the driver/operator application provides the following services and possibly other services to the driver/operator by interacting with the transport service platform: GPS information, dispatching data input, ticket validation, transit card validation, driver profile information, transit card transactions, stop vehicle indications, crew/driver scheduling information, vehicle identification information, human resource management system (HRMS). A view of a user operator device with an enlarged "screen shot" of a user interface of a driver/operator application in accordance with an embodiments of this invention is shown in FIG. 15.

Figure 15:
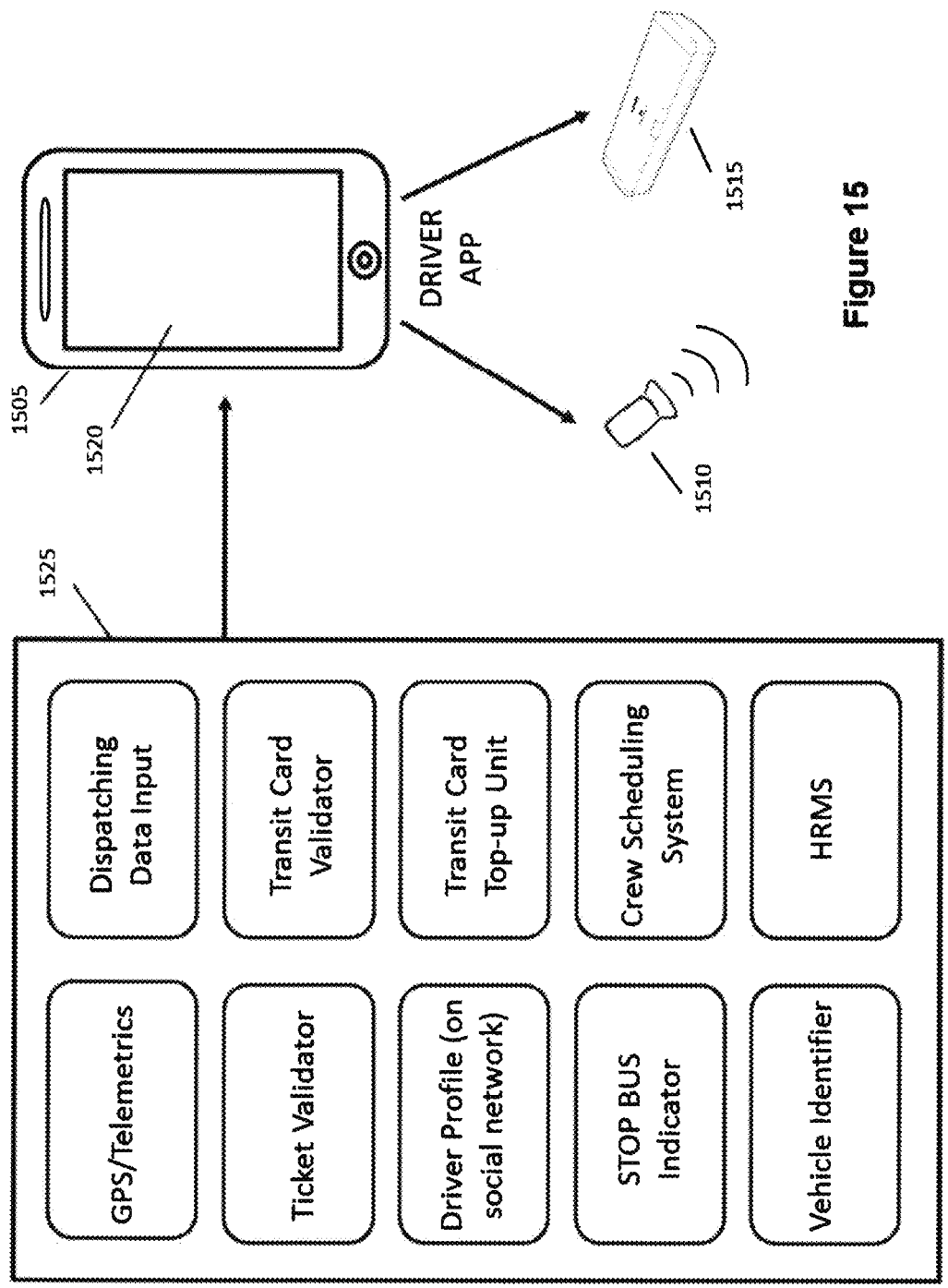
FIG. 15 illustrating a driver/operator device executing a driver/operator application in accordance with an embodiment of the invention.

In FIG. 15, driver/operator device 1505 is a smartphone with connections to a GPS device 1510 and a card scanning unit 1515. An enlarged "screen shot" 1525 from display 1520 is shown. The "screen shot" 1525 is of a user interface for a driver/operator application being executed by device 1505. The user interface includes buttons or tabs that may be touched to perform the shown functions including a GPS/telemetrics function, a dispatching data input function, a ticket validation function, a transit card validator function, a driver profile interaction function, a transit card transaction function, a stop bus indicator function, a crew scheduling information function, vehicle identifier function, and a HRMS function.

Although one specific embodiment of a driver/operator device and user interface for a driver/operator application is shown in FIG. 15, one skilled in the art will recognize that other device may be used and the user interface may provide any number of additional functions without departing from this invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A transportation services platform for providing transportation services to a user via a transportation services application executed on a user device comprising:
    one or more processing systems communicatively connected;
    memory readable by each of the one or more processing systems; and
    instructions stored in the memory that direct the one or more processing systems to:
        receive a request from an application being executed on a user device to provide a route for a trip;
        retrieve route information for the trip, where the retrieving of route information includes:
            determining rules provided by third party transportation services that apply to the route of the trip, where the rules include an event and an action wherein the event is an occurrence that is detected by data obtained by the application being executed on the user device and an action is a function that the application performs;
            adding the rules provided by third party transportation services that apply to the route information, and wherein the rules are stored in the memory;
        provide the route information to the application being executed on the user device.

2. The transportation services platform of claim 1 wherein the instructions further include instructions for directing the one or more processing system to receive a rule from a third party transportation service system and to store the rule in a rules database.

3. The transportation services platform of claim 2 wherein a rule provided by a third party transportation service system includes an event and an action, where the action includes invoking a third party transportation service application on the user device.

4. The transportation services platform of claim 2 wherein a rule provided by a third party transportation service system includes an event and an action, where the action includes obtaining travel data via the transportation services application being executed by the user device and providing the travel data to the third party transportation service application.

5. The transportation services platform of claim 2 wherein a rule provided by a third party transportation service system includes an event and an action, where the action includes providing travel information to the transportation services application being executed by the user device and displaying the travel information to the user via the transportation services application being executed by the user device.

6. The transportation services platform of claim 1 wherein the instructions for directing the one or more processors further include instructions for directing the one or more processors to maintain a user database that associates user profile information of a user with a username.

7. The transportation services platform of claim 6 wherein the instructions for directing the one or more processors further include instructions for directing the one or more processors to store and provide comments by a user using the username associated with the user.

8. The transportation services platform of claim 6 wherein the instructions for directing the one or more processors further include instructions for directing the one or more processors to perform a request for interactions with a third party transportation service system requested by a user using the username associated with the user.

9. The transportation services platform of claim 1 wherein the instructions for directing the one or more processors further include instructions for directing the one or more processors to: receive a request for information from a transit operator system; retrieve data stored by the transportation services platform to satisfy the request for information; and provide the requested information to the transit operator system.

10. The transportation services platform of claim 1 wherein the instructions for directing the one or more processors further include instructions for directing the one or more processors to: receive data pertaining to a transportation service from a transit operator system; and store the data in a memory associated with the transportation services platform.

11. The transportation services platform of claim 1 wherein the instructions for directing the one or more processors further include instructions for directing the one or more processors to: maintain information including one or more tags in a user profile of a user; receive a posting to the transportation services platform; determine tags associated with the posting; and
provide the posting to each user having a user profile with a tag associated with the posting.

12. The transportation services platform of claim 1 wherein the instructions for directing the one or more processors further include instructions for directing the one or more processors to: receive an update of user information; determine tags associated with the update;
and add the tags to user profile information stored by the platform.

13. The transportation services platform of claim 12 wherein the instructions for directing the one or more processors further include instructions for directing the one or more processors to: predict possible trips for a user based upon stored user information;
and update tags in the user profile information of the user based on the predicted possible trips.

14. A method for providing transportation services over a network using a transportation services platform, the method comprising:
   providing one or more processing systems and a memory readable by the one or more processing systems that store instructions for performing the method;
   receiving a request from an application being executed on a user device to provide a route for a trip;
   retrieving route information for the trip from information stored by the transportation services platform, where the retrieving of route information includes:
      determining rules provided by third party transportation services that apply to the route of the trip, where the rules include an event and an action wherein the event is an occurrence that is detected by data obtained by the application being executed on the user device and an action is a function that the application performs;
      adding the rules provided by third party transportation services that apply to the route information, and wherein the rules are stored in the memory; and
      providing the route information to the application being executed on the user device over the network.

15. The method of claim 14 further comprising receiving a rule from a third party transportation service system and to store the rule in a rules database.

16. The method of claim 15 wherein a rule provided by a third party transportation service system includes an event and an action, where the action includes invoking a third party transportation services application on the user device.

17. The method of claim 15 wherein a rule provided by a third party transportation service system includes an event and an action, where the action includes obtaining travel data via the transportation services application being executed by the user device and providing the travel data to the third party transportation service application.

18. The method of claim 15 wherein a rule provided by a third party transportation service system includes an event and an action, where the action includes providing travel information to the transportation services application being executed by the user device and displaying the travel information to the user via the transportation services application being executed by the user device.

19. The method of claim 14 further comprising maintaining a user database that associates user profile information of a user with a username.

20. The method of claim 19 further comprising storing and providing comments by a user using the username associated with the user.

21. The method of claim 19 further comprising performing a request for interactions with a third party transportation service system requested by a user using the username associated with the user.

22. The method of claim 14 further comprising: receiving a request for information from a transit operator system; retrieving data stored by the transportation services platform to satisfy the request for information; and providing the requested information to the transit operator system.

23. The method of claim 14 further comprising: receiving data pertaining to a transportation service from a transit operator system; and storing the data in a memory associated with the transportation services platform.

24. The method of claim 14 further comprising: maintaining information including one or more tags in a user profile of a user; receiving a posting to the transportation services platform; determining tags associated with the posting; and providing the posting to each user having a user profile with a tag associated with the posting.

25. The method of claim 14 further comprising: receiving an update of user information; determining tags associated with the update; and adding the tags to user profile information stored by the platform.

26. The method of claim 25 further comprising: predicting possible trips for a user based upon stored user information; and updating tags in the user profile information of the user based on the predicted possible trips.

27. A system for providing transportation services to an application executed on a user device comprising:
   one or more processing systems communicatively connected;
   memory readable by each of the one or more processing systems;
   wherein, the one or more processing systems comprise:

circuitry configured to receive a request from an application being executed on a user device to provide a route for a trip;

circuitry configured to retrieve route information for the trip from information stored by the transportation services platform, where the retrieving of route information includes: circuitry configured to determine rules provided by third party transportation services that apply to the route of the trip, where the rules include an event and an action wherein the event is an occurrence that is detected by data obtained by the application being executed on the user device and an action is a function that the application performs;

circuitry configured to store in the memory the rules provided by third party transportation services that apply to the route information; and circuitry configured to provide the route information to the application being executed on the user device over the network.

28. The system of claim 27 further comprising circuitry configured to receive a rule from a third party transportation service system and circuitry configured to store the rule in a rules database.

29. The system of claim 28 wherein a rule provided by a third party transportation service system includes an event and an action, where the action includes invoking a third party transportation services application on the user device.

30. The system of claim 28 wherein a rule provided by a third party transportation service system includes an event and an action, where the action includes obtaining travel data via the transportation services application being executed by the user device and providing the travel data to the third party transportation service application.

31. The system of claim 28 wherein a rule provided by a third party transportation service system includes an event and an action, where the action includes providing travel information to the transportation services application being executed by the user device and displaying the travel information to the user via the transportation services application being executed by the user device.

32. The system of claim 27 further comprising circuitry configured to maintain a user database that associates user profile information of a user with a username.

33. The system of claim 32 further comprising circuitry configured to store and provide comments by a user using the username associated with the user.

34. The system of claim 32 further comprising circuitry configured to perform a request for interactions with a third party transportation service system requested by a user using the username associated with the user.

35. The system of claim 27 further comprising: circuitry configured to receive a request for information from a transit operator system; circuitry configured to retrieve data stored by the transportation services platform to satisfy the request for information; and circuitry configured to provide the requested information to the transit operator system.

36. The system of claim 27 further comprising: circuitry configured to receive data pertaining to a transportation service from a transit operator system; and circuitry configured to store the data in a memory associated with the transportation services platform.

37. The system of claim 27 further comprising: circuitry configured to maintain information including one or more tags in a user profile of a user; circuitry configured to receive a posting to the transportation services platform; circuitry configured to determine tags associated with the posting; and circuitry configured to provide the posting to each user having a user profile with a tag associated with the posting.

38. The system of claim 27 further comprising: circuitry configured to receive an update of user information; circuitry configured to determine tags associated with the update; and circuitry configured to add the tags to user profile information stored by the platform.

39. The system of claim 38 further comprising: circuitry configured to predict possible trips for a user based upon stored user information; and circuitry configured to update tags in the user profile information of the user based on the predicted possible trips.

* * * * *